UNITED STATES PATENT OFFICE.

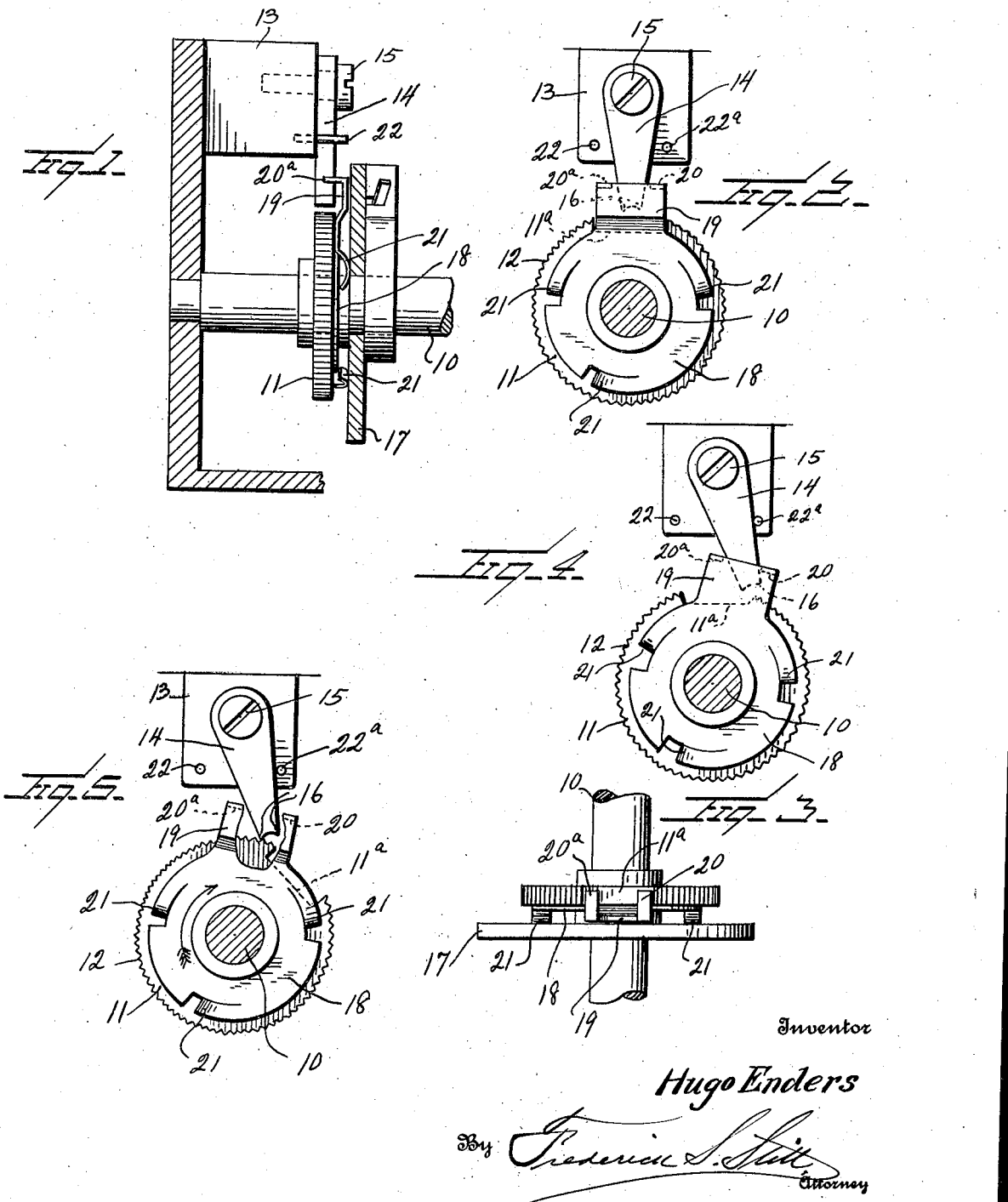

HUGO ENDERS, OF BELLEVILLE, NEW JERSEY, ASSIGNOR TO THE LEHIGH CORPORATION, OF NEW YORK, N. Y., A CORPORATION OF DELAWARE.

FRICTIONALLY-OPERATED FULL-STROKE MECHANISM.

1,414,728.    Specification of Letters Patent.    Patented May 2, 1922.

Application filed April 9, 1921. Serial No. 460,107.

*To all whom it may concern:*

Be it known that I, HUGO ENDERS, a citizen of the Republic of Germany, residing at Belleville, in the county of Essex and State of New Jersey, have invented certain new and useful Improvements in Frictionally-Operated Full-Stroke Mechanism, of which the following is a specification.

This invention relates to means used in calculating machines for the purpose of preventing a reverse movement of the shaft until a complete rotation of the shaft in one direction has been secured.

In many types of calculating machines, there is provided a reckoning shaft which must be rotated in one or the other direction in order to act with the reckoning disks or wheels and the calculating mechanism operated thereby, and it is necessary to provide means which, upon the initial rotation of the reckoning shaft, will act to prevent any reverse rotation thereof until a complete rotation has been made, thus obviating the danger of breaking or damaging the springs in the mechanism or breaking or damaging the gears thereof or causing improper adjustment of the calculating mechanism to be made.

In my application, Serial #385,687, filed June 5, 1920, I have shown one means for preventing this reverse rotation, and the object of the present invention is to improve upon and simplify the construction illustrated in my prior application, and provide a mechanism wherein the pawl which acts to prevent reverse rotation swings freely upon its pivot, and wherein there is no friction on this pawl itself. Where there is friction on the pawl, there is always a chance of slipping because of the relatively small size of the pawl, but by eliminating this friction I eliminate this chance of slipping and provide means whereby the pawl is more quickly and positively actuated.

Other objects will appear in the course of the following description.

My invention is illustrated in the accompanying drawings, wherein:—

Figure 1 is a fragmentary vertical sectional view of one end of a calculating machine showing my invention applied thereto, the disk 17 being shown in section;

Figure 2 is an elevation of the construction shown in Figure 1, the disk 17 being removed, the parts being shown in such position as will best illustrate the structure;

Figure 3 is a top plan view of the actuating shaft with my invention applied thereto, with the parts in the position shown in Figures 1 and 2;

Figure 4 is a like view to Figure 2, but showing the parts in their normal or zero position;

Figure 5 is a like view to Figure 4, but showing the position of the parts when the shaft has been rotated in a clockwise direction a certain distance;

Referring to these drawings, 10 designates the reckoning shaft of a calculating machine of the character described, rotatable by means of a crank handle at one end of the shaft, the crank handle not being shown. The rotation of this shaft causes the operation of the calculating mechanism (not illustrated), this calculating mechanism being of a well known type and forming no part of my invention.

Carried upon the shaft 10 is the ratchet wheel 11 which is fast upon the shaft to rotate therewith. This ratchet wheel is provided over the greater portion of its periphery with with approximately V-shaped ratchet teeth 12, these teeth being interrupted for a distance and at this point the periphery of the ratchet wheel is depressed and flattened or straight, as at 11$^a$. Mounted upon a supporting lug 13 above the shaft 10 is a pawl 14 which is swingingly mounted upon a screw 15 extending into the lug 13. This pawl tapers from its pivot end toward its toothed extremity, and the free extremity of the pawl is concave to provide two teeth 16 which are adapted to coact with the ratchet teeth 12. By providing two teeth, only one tooth is worn when running in either direction, thus making the pawl last longer than it otherwise would do.

Mounted upon the shaft 10 to rotate therewith is a disk 17, and disposed between this disk and the ratchet wheel 11 is a thin, metallic, resilient disk 18 whose diameter is smaller than the diameter of the ratchet wheel 11. This disk is formed to provide an outwardly extending, offset radial portion 19 which I will term an arm, the outer extremity of this arm being formed with two angularly bent lugs 20 and 20ª which extend toward the path of movement of the pawl 16, these lugs being separated from each other a distance sufficient to permit the insertion of the end of the pawl between the lugs and permit a rocking movement of the pawl. This disk 18 is formed at a plurality of points with spring leaves 21 which are deflected to bear against the disk 17, the faces of the leaves which bear against the disk 17 being convexly curved. Thus the resilience of these leaves 21 causes the disk and leaves to bear frictionally against the ratchet wheel 11 and the disk 17 respectively so that unless the resilient disk 18 is impeded in its movement, it will rotate with the ratchet wheel 11 and the disk 17.

Projecting from the lug 13 on each side of the pawl 14 are the outwardly projecting stops 22 and 22ª which are preferably in the form of pins. These stops limit the movement of the pawl 14 in either direction.

In the normal position of the parts and when the shaft 10 is in zero position and the reckoning disks are consequently in their zero position, the arm 19 will be inclined, as in Figure 4, with relation to a line passing through the axis of the pawl and the axis of the shaft 10, and the pawl will be held against one of the stops 22 or 22ª by means of one of the lugs 20 or 20ª depending upon the direction in which the shaft 10 has been previously turned and with the extremity of the pawl directed toward the interruption 11ª in the ratchet teeth. If now the shaft 10 be turned in a clockwise direction beyond the position shown in Fig. 4, the pawl will be held by the plate 18 in the position shown in Figure 4, so that the pawl is out of contact with and rides over the faces of the teeth.

If now, however, an attempt be made to reverse the rotation of the shaft 10, the plate 17, and the ratchet 11, the lug 20ª will immediately leave its contact with the pawl and the pawl will immediately drop by gravity onto the teeth 12, and, as illustrated in Figure 5, prevent the reverse rotation of the shaft 10. The shaft, therefore, cannot be reversely rotated, as for instance rotated in a counter-clockwise direction, until a complete rotation has been made in a clockwise direction and the parts brought back to the position shown in Figure 4. If, after the parts are brought back to the position shown in Figure 4, a counter-clockwise rotation of the shaft be made, the disk 18 will, of course, shift with the ratchet wheel and the lug 20 will shift the pawl toward the left in Figure 4 until it strikes the stop 22. This will prevent the disk 18 from turning any further in this direction and the stop 22 will prevent the pawl from turning any further in this direction and the parts will be held in this position while the shaft 10 is making a counter-clockwise rotation. If, however, it is attempted to reverse the shaft after the pawl is shifted and turn the shaft in a clockwise direction, then the initial movement in a clockwise direction will act to carry the extremity of the pawl downward against the teeth 12 and the pawl will prevent this clockwise rotation of the shaft in the manner heretofore described. Thus it will be seen that once the initial movement is made to rotate the shaft 10 in one or the other direction, this rotation must be completed before the shaft can be reversed in its rotation.

It will be noted that the pawl is freely pivoted so that the pawl will swing into contact wtih the teeth immediately upon any attempt to reverse the action of the shaft. This is because the pawl is not frictionally engaged by anything. The pawl is held normally as illustrated in Figure 4 so that as soon as the stop 20ª starts to move away from the pawl, the stop 20 engages the pawl. Thus the pawl is forced into engagement with the teeth not only because it is free to swing downward under the action of gravity but because it is positively forced downward into engagement with the teeth by the lugs 20 or 20ª. In all devices, however, where the pawl is shifted to prevent reverse movement by means having frictional engagement with the pawl itself, there is liable to be slippage because of the very small size of the pawl. In this improvement, however, there is no frictional engagement with the pawl but friction is secured between the two disks 11 and 17 by the three leaf springs 21 carried by the disk 18. This always insures a sure grip on the pawl and quick action.

I have found this device in practice to be much more accurate and positive than the device forming the subject matter of my prior application, inasmuch as it is simpler in construction and therefore cheaper.

I claim:—

1. Means for preventing reverse movement of a movable member including a shiftable element, a normally freely swinging oscillatory locking member, stops limiting the movement of the oscillatory locking member in opposite direction, and means for bringing said locking member into engagement with said element upon a reverse movement of said element including means carried by and having frictional engagement with said shiftable element and having positive rocking engagement with the oscillatory locking member.

2. Means to prevent reverse movement of a rotary member including a rotatable ratchet wheel, a freely oscillatable locking pawl coacting with the ratchet wheel, stops limiting the movement of the pawl in opposite directions, and a member carried by and having frictional engagement with the ratchet wheel for movement therewith and having positive rocking engagement with the pawl.

3. Means to prevent reverse movement of a movable member including a shiftable element having teeth and having its teeth interrupted at one point, a pawl coacting with said toothed member and normally supported with its extremity in said interruption of the teeth, stops limiting the movement of the pawl in either direction, and means for holding said pawl out of engagement with the teeth upon an initial movement of said shiftable member in either direction but acting to bring the pawl into engagement with the teeth upon a reverse movement of the shiftable member after an initial movement in one direction, comprising a member carried by and having frictional engagement with the shiftable member and having positive engagement with the pawl.

4. Means to prevent reverse movement of a rotary member including a rotatable ratchet wheel having ratchet teeth interrupted at one point, a locking pawl normally supported with its extremity in the interruption of the teeth and having limited swinging movement, and a member having frictional operative engagement with the ratchet wheel for rotation therewith about the axis of the wheel in either direction and having positive engagement with the pawl to shift it in either direction when the ratchet wheel is shifted.

5. Means to prevent reverse movement of a rotary member including a rotary element having ratchet teeth on its periphery, the ratchet teeth being interrupted at one point, a freely pivoted locking pawl normally supported with its extremity in the interruption in said ratchet teeth, means limiting the oscillatory movement of the pawl, and a member mounted for rotation concentric to the axis of the rotary element and having operative frictional engagement with the ratchet wheel to initially rotate therewith and having positive engagement with the pawl whereby to oscillate the pawl in one direction or the other for the limit of its movement upon an initial rotation of the ratchet wheel in one or the other direction.

6. Means to prevent reverse movement of a rotary member including a rotary element having ratchet teeth on its periphery, the teeth being interrupted for a distance, a pivoted pawl normally supported with its extremity in said interruption of said ratchet teeth, stops limiting the movement of the pawl in either direction, a member rotatable around the same axis as the ratchet wheel and confronting the ratchet wheel and rotating therewith, and a disk disposed between said member and the ratchet wheel and having resilient frictional engagement therewith and having positive engagement with the pawl.

7. Means to prevent reverse movement of a rotary member including a rotary element having ratchet teeth upon its periphery, the teeth being interrupted for a distance, a pawl normally supported with its extremity in the interruption of said ratchet teeth, stops limiting the movement of the pawl in either direction, a member confronting the ratchet wheel and rotating therewith, and a disk disposed between said member and the ratchet wheel and having resilient members whereby the disk is urged into frictional engagement with the member and ratchet wheel, said disk having a radially projecting portion formed with two spaced stops and between which the pawl is disposed.

8. Means for preventing reverse movement of a rotatable member including a ratchet wheel having ratchet teeth on its periphery interrupted at one point, a pivoted pawl normally supported with its extremity in the interruption of said ratchet teeth and coacting with the teeth, a member rotatable around the axis of the ratchet wheel and having frictional operative engagement with the ratchet wheel to be initially rotated therewith, said member having a projecting portion formed with two stops between which said pawl depends, the stops engaging on each side of the pawl.

9. Means to prevent reverse movement of a rotatable member including a ratchet wheel having ratchet teeth on its periphery interrupted at one point, a pivoted pawl normally supported with its extremity in the interruption between the ratchet teeth and coacting with the teeth, stops limiting the oscillation of the pawl, and a member disposed concentrically to the axis of the ratchet wheel and having frictional operative engagement with the ratchet wheel for initial movement therewith, said member having a radially projecting portion formed with angularly extending stops between which the depending extremity of the pawl is disposed, said stops engaging on opposite sides of the pawl.

10. Means to prevent reverse movement of a rotatable member including a ratchet wheel having ratchet teeth on its periphery interrupted at one point, a pivoted pawl normally supported with its extremity in the interruption between the ratchet teeth and coacting with the teeth, stops limiting the movement of the pawl in either direction, a member concentric to the axis of the ratchet wheel and rotatable with the ratchet wheel, and a disk disposed between the member and the ratchet wheel and having resilient leaves bearing against the member and urging the disk into frictional engagement with the ratchet wheel, said disk having a radially projecting arm formed with stops between which the free extremity of the pawl is received and engaged.

11. Means to prevent reverse movement of a rotary member including a shaft, a ratchet wheel carried on the shaft and having its teeth interrupted for a distance at one point, a pawl normally supported with its extremity in the interrupted portion of the teeth, stops limiting the oscillation of the pawl, and a member rotatable with and around the axis of the shaft by friction and having positive rocking engagement with the pawl whereby upon a rotation of the shaft in one direction said member shall shift the pawl against one of said stops and from its normal position, but upon a reverse movement of the shaft the member shall shift the pawl into engagement with the teeth of the ratchet wheel to thereby prevent a reverse movement of the ratchet wheel.

12. A full stroke mechanism including a ratchet wheel, a freely pivoted pawl arranged to engage the ratchet teeth of the wheel, friction means carried by the wheel and acting on the initial movement of the wheel in one direction to carry the pawl out of engagement with the teeth and to hold the same in such position so long as the rotation of the wheel is continued in the same direction but shifting the pawl into engagement with the teeth upon the reverse movement of the wheel, and means to prevent disengagement of the pawl from said friction means.

In testimony whereof I affix my signature.

HUGO ENDERS.